United States Patent
Hoffmann (10) Patent No.: US 10,759,430 B2
(45) Date of Patent: Sep. 1, 2020

(54) BRAKING SYSTEM FOR BRAKING AN ELECTRIC VEHICLE

(71) Applicants: Hyundai Motor Company, Seoul (KR); Kia Motors Corporation, Seoul (KR)

(72) Inventor: Stefan Hoffmann, Russelsheim (DE)

(73) Assignees: Hyundai Motor Company, Seoul (KR); Kia Motors Company, Seoul (KR)

( * ) Notice: Subject to any disclaimer, the term of this patent is extended or adjusted under 35 U.S.C. 154(b) by 0 days.

(21) Appl. No.: 16/205,965

(22) Filed: Nov. 30, 2018

(65) Prior Publication Data

US 2020/0086875 A1    Mar. 19, 2020

(30) Foreign Application Priority Data

Sep. 14, 2018  (DE) .......... 10 2018 215 653

(51) Int. Cl.
| | |
|---|---|
| *B60T 7/06* | (2006.01) |
| *B60W 30/18* | (2012.01) |
| *B60T 1/10* | (2006.01) |
| *G05G 1/30* | (2008.04) |
| *B60W 10/184* | (2012.01) |
| *B60W 10/08* | (2006.01) |

(52) U.S. Cl.
CPC ......... *B60W 30/18127* (2013.01); *B60T 1/10* (2013.01); *B60T 7/06* (2013.01); *B60W 10/184* (2013.01); *G05G 1/30* (2013.01); *B60W 10/08* (2013.01)

(58) Field of Classification Search
CPC .......... B60T 1/10; B60T 13/586; G05G 1/38; G05G 1/30
USPC ............................ 303/152; 180/165; 74/512
See application file for complete search history.

(56) References Cited

U.S. PATENT DOCUMENTS

| | | | | |
|---|---|---|---|---|
| 5,632,534 | A * | 5/1997 | Knechtges | B60L 3/108 303/152 |
| 5,895,100 | A * | 4/1999 | Ito | B60L 7/26 303/152 |
| 7,232,192 | B2 | 6/2007 | Teslak et al. | |
| 7,922,265 | B1 * | 4/2011 | Cottrell, V | B60T 1/10 303/113.1 |
| 8,899,696 | B2 * | 12/2014 | Weiberle | B60T 8/4872 303/114.1 |
| 9,266,507 | B2 * | 2/2016 | Shand | G05G 1/30 |
| 10,391,995 | B2 * | 8/2019 | Ohm | B60T 8/4077 |

(Continued)

*Primary Examiner* — Christopher P Schwartz
(74) *Attorney, Agent, or Firm* — Mintz Levin Cohn Ferris Glovsky and Popeo, P.C.; Peter F. Corless (57) ABSTRACT

A braking system for braking an electric vehicle is provided. The system includes a brake pedal having a regenerative-braking range of pedal displacement from an initial position of the brake pedal to a maximal-recuperation position of the brake pedal, and a mechanical-braking range of pedal displacement starting from the maximal-recuperation position of the brake pedal. A brake controller activates deceleration of the vehicle based on the pedal displacement. The brake controller activates deceleration of the electric vehicle based on regenerative braking within the regenerative-braking range and based on mechanical braking within the mechanical-braking range. The regenerative-braking range is adjusted based on a state of charge of a traction battery of the electric vehicle.

12 Claims, 3 Drawing Sheets

(56) References Cited

U.S. PATENT DOCUMENTS

| | | | |
|---|---|---|---|
| 2006/0196712 A1* | 9/2006 | Toyota | B60K 6/445 |
| | | | 180/165 |
| 2008/0173490 A1* | 7/2008 | Itoh | B60T 13/586 |
| | | | 180/165 |
| 2008/0245178 A1* | 10/2008 | Fujiwara | G05G 1/38 |
| | | | 74/512 |
| 2013/0025273 A1* | 1/2013 | Nozawa | B60T 7/042 |
| | | | 60/545 |

* cited by examiner

BRAKING SYSTEM FOR BRAKING AN ELECTRIC VEHICLE

CROSS-REFERENCE TO RELATED APPLICATION

This Application claims under 35 U.S.C. § 119(a) the benefit of German Patent Application No. 102018215653.0 filed on Sep. 14, 2018. The entire contents of these applications are incorporated herein by reference in their entirety.

TECHNICAL FIELD

The present invention relates to a braking system for braking an electric vehicle and an electric vehicle with such a braking system.

BACKGROUND

Current electric vehicles, in particular hybrid vehicles, employ recuperative and/or regenerative braking techniques to utilize a maximum amount of kinetic energy of the vehicle by using the electric engine as a generator to recharge a traction battery of the vehicle and/or to power equipment of the vehicle during a braking maneuver. By employing regenerative braking, the range of electric vehicles may be increased and the fuel consumption and thus the $CO_2$ emissions may be reduced significantly, in particular in urban traffic situations involving frequent braking and/or acceleration.

In case of conventional braking systems, normally both a mechanical brake (e.g. a vacuum pressure actuated friction brake for braking the wheels) and a regenerative brake operate in parallel, that is, simultaneously, such that a less than optimal amount of energy may actually be recuperated. To improve on such conventional systems, cooperative braking systems have been introduced. These systems provide a direct distribution of braking power to a mechanical brake and an e-machine brake depending on the specific driving situation. For example, the braking power of the e-machine may be used in regenerative mode under average driving conditions. However, the available e-machine power may vary based on factors such as speed and battery state of charge. Accordingly, in specific cases and/or for specific states of charge of the battery, the friction brake may be used to support and/or substitute the regenerative braking, e.g. for rapid deceleration, at low speed and/or in stationary situations.

Such systems are particularly useful in case of electric engines with high power output. However, in some use cases, e.g. mild hybrids or other hybrids with small electric engines, regenerative braking may be limited. In these and other cases the above solutions may be over-engineered and/or too costly.

SUMMARY

Accordingly, there is a need to develop simplified and more cost efficient solutions for braking systems of electric vehicles that may exploit the recuperation potential and provide a consistent brake feeling for the driver. The present invention provides a braking system and an electric vehicle having a braking system.

According to one aspect of the invention, a braking system for braking an electric vehicle may include a brake pedal having a regenerative-braking range of pedal displacement from an initial position of the brake pedal to a maximal-recuperation position of the brake pedal, and a mechanical-braking range of pedal displacement starting from the maximal-recuperation position of the brake pedal; and a brake controller configured to activate deceleration of the electric vehicle based on the pedal displacements. The brake controller may further be configured to activate deceleration of the electric vehicle based on regenerative braking within the regenerative-braking range and based on mechanical braking within the mechanical-braking range. Additionally, the brake controller may be configured to adjust the regenerative-braking range based on a state of charge of a traction battery of the electric vehicle.

According to another aspect of the invention, an electric vehicle may include an electric engine, a traction battery and a braking system. The present invention provides a defined range of non-friction braking in a brake pedal, which is used for recuperative braking and which is activated in a first phase of braking after the brake pedal has been pressed. To avoid a potential undefined and/or inconsistent brake pedal feel of the driver when, for example, the traction battery is fully charged, the brake controller may be configured to adjust the regenerative-braking range accordingly. As a consequence, it may be possible to apply the maximal available recuperation power in a first stage of the braking process. The mechanical friction brakes may then be only used subsequently, if at all, when the driver engages the brake pedal further than the regenerative-braking range. This is particularly relevant when the capacity of the regenerative braking is insufficient for the braking maneuver.

The present solution thus improves fuel efficiency and $CO_2$ reduction and generally extends the driving range of the vehicle. Moreover, wear of the mechanical (friction) brakes may be reduced and ultimately costs may be saved. Changes in recuperative braking due to the state of charge of the traction battery may be compensated, thus providing a more constant brake feel for the driver. The brake controller of the present invention may particularly be integrated in the brake pedal. In particular, the present system may principally be retrofitted to vehicles with conventional braking systems as only the brake pedal itself has to be replaced.

According to an exemplary embodiment of the invention, the brake controller may be configured to reduce the regenerative-braking range with increasing state of charge of the traction battery. The brake controller may be particularly configured to continuously reduce the regenerative-braking range with increasing state of charge of the traction battery. The regenerative-braking range may thus be decreased in correspondence to the state of charge of the traction battery. In particular, the regenerative-braking range may be decreased until it reaches a negligible length, which means that regenerative braking is not utilized at all and the mechanical brake may be activated after engaging the brake pedal.

According to an exemplary embodiment of the invention, the brake controller may be configured to start reducing the regenerative-braking range when the state of charge of the traction battery exceeds a predefined charge threshold. In particular, regenerative braking may be fully utilized as long as the state of charge of the traction battery does not exceed the predefined threshold. As soon as this happens, the regenerative-braking range may be reduced, e.g. continuously. Additionally, the brake controller may be configured to adjust the regenerative-braking range to reach a maximal available recuperation of the electric vehicle at the maximal-recuperation position of the brake pedal. In particular, the recuperation potential of the electric engine and/or the traction battery may be fully utilized. Usage of mechanical braking, e.g. vacuum assisted friction braking, may be reduced to where the full power of regeneration braking is insufficient to perform the requested braking maneuver.

Furthermore, the brake controller may be configured to reduce the regenerative-braking range to substantially zero when the traction battery is in an error state and/or the traction battery is fully charged. An error state of the traction battery may be, for example, any case of system failure of the traction battery wherein the battery is not (fully) operational. More generally, an error state of the traction battery may be defined as any case of system failure, in which the electric components of the power train are not fully operational. In one particular example, the electric engine, that is the electric machine, may be switched off, may be disconnected from the traction battery and/or may not be operational.

According to an exemplary embodiment of the invention, the braking controller may include a pedal adjuster configured to adjust the regenerative-braking range. The braking controller may be integrated in and/or attached to the brake pedal. In other exemplary embodiments merely the pedal adjuster may be integrated in and/or attached on the brake pedal. In this particular example, the braking system may be retrofitted to existing systems as only the brake pedal may need to be replaced with the brake pedal of the present invention (the latter comprising the pedal adjuster and/or the braking controller).

According to an exemplary embodiment of the invention, the pedal adjuster may include a linear pedal adjuster configured to linearly adjust the regenerative-braking range, an eccentric pedal adjuster configured to adjust the regenerative-braking range with an eccentric element and/or a rotating pedal adjuster configured to rotatably adjust the regenerative-braking range. For example, the linear pedal adjuster may be a small electric motor, which may move a slider in a horizontal direction in an aperture within the brake pedal, the aperture may define the regenerative-braking range. The slider may progressively close the aperture, thus reducing the regenerative-braking range.

In one particular exemplary embodiment, a gear drive may be used including a gear wheel driven by an electric motor and being in mechanical connection with a sliding gear rack. The electric motor may be fixed on the brake pedal. In another example, an electric motor may move, e.g. rotate, an eccentric element, which due to a specific shape thereof, may provide different regenerative-braking ranges by closing an aperture defining the regenerative-braking range. The electric motor as well as the eccentric element may be fixed on the brake pedal. In another example, the pedal adjuster may be configured as a rotatable lever or similar, e.g. a threaded shank of a spindle (drive) driven by an electric motor fixed on the brake pedal. A clockwise rotation may enlarge the aperture and an anticlockwise rotation may reduce the aperture, or vice versa, thus increasing or decreasing the regenerative-braking range. Alternatively, the spindle drive may be used to elongate or decrease a push rod of the braking system, which defines the response of the mechanical braking. In that case the electric motor may be fixed on the push-rod.

Moreover, the regenerative-braking range may be defined by an elongated aperture within the brake pedal. The elongated aperture may be adjustable in length to adjust the regenerative-braking range. The elongated aperture may be particularly adjustable by the pedal adjuster in length to adjust the regenerative-braking range. For example, a push rod of the braking system for activation of the mechanical brake may be mounted within a horizontally arranged long aperture of the brake pedal via a bearing element being slidably interlocked with the aperture such that the brake pedal only starts pushing the push rod, and thus activates the mechanical brake, when the bearing element touches a distant end of the aperture with respect to the push rod.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification.

Although specific exemplary embodiments are illustrated and described herein, it will be appreciated by those of ordinary skill in the art that a variety of alternate and/or equivalent implementations may be substituted for the specific exemplary embodiments shown and described without departing from the scope of the present invention. Generally, this application is intended to cover any adaptations or variations of the specific exemplary embodiments discussed herein.

The drawings illustrate the exemplary embodiments of the present invention and together with the description serve to explain the principles of the invention. Other exemplary embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION OF THE EMBODIMENTS

It is understood that the term "electric vehicle" or other similar term as used herein is inclusive of motor vehicles in general that have at least one electric motor and comprises motorcycles and passenger automobiles including sports utility vehicles (SUV), buses, trucks, various commercial vehicles, and the like, as well as hybrid vehicles, electric vehicles, plug-in hybrid electric vehicles, hydrogen-powered vehicles and other alternative fuel vehicles with at least an additional electric machine (e.g., fuels derived from resources other than petroleum). As referred to herein, a hybrid vehicle is a vehicle that has two or more sources of power, for example both gasoline-powered and electric-powered vehicles. Moreover, it is to be understood that electric vehicles according to the invention further comprise other vehicles having an electric motor, e.g. electric bicycles. In the latter case, for example, the braking system of the invention may pertain to a bicycle brake. The term "brake pedal" as used herein generally refers to a mechanical brake control device, which may be operated by a driver in order to brake the electric vehicle. It is understood that a brake pedal according to the invention not only refers to devices being operated by foot (a brake pedal in the literal sense) but also to devices being operated by hand or similar (e.g. a brake lever of a bicycle).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
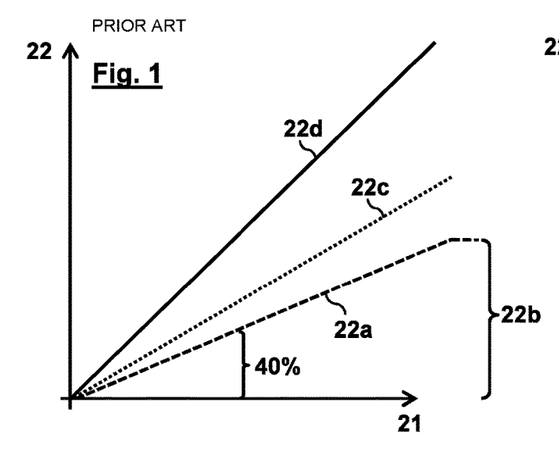
FIG. 1 schematically depicts an example for braking power as a function of pedal displacement according to a conventional braking system.
Figure 6:
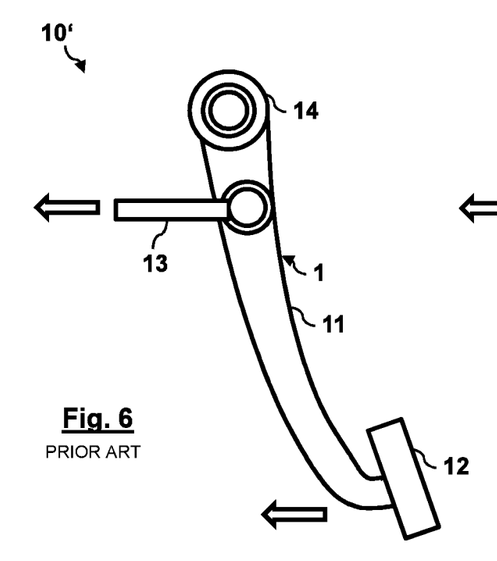
FIG. 6 schematically shows a conventional braking system according to an example.

FIG. 1 schematically depicts an example for braking power 22 as a function of pedal displacement 21 according to a conventional braking system 10', e.g. as depicted in FIG. 6. This example of a conventional braking system 10' includes a brake pedal 1 with a food pad 12 attached to a brake lever 11, the brake lever 11 being mounted to an electric vehicle (not depicted) at a fulcrum 14. The brake pedal is further connected to a push rod 13 that activates a mechanical brake of the braking system 10' when the foot pad 12 is engaged (left in FIG. 6, cf. arrows). The braking system 10' includes two braking mechanisms operating in parallel, namely a mechanical brake as operated by the push rod 13 and a regenerative brake, which is driven by an electric engine and a traction battery of the electric vehicle. The mechanical brake may be, for example, a vacuum boosted friction brake of the electric vehicle wheels.

As shown in FIG. 1, a total braking power 22d is the sum of regenerative-braking power 22a of the regenerative brake and mechanical-braking power 22c of the mechanical brake. The regenerative-braking power in this particular example provides 40% of the total braking power 22d. As further shown, maximal regenerative-braking power 22b is only fully exploited at the far right end of the functional plot that is for very large values of pedal displacement 21. At smaller values of pedal displacement 21 however, only a fraction of the maximal regenerative-braking power 22b is used. Hence, the fuel saving potential of regenerative braking is not fully exploited in this conventional case.

Figure 2:
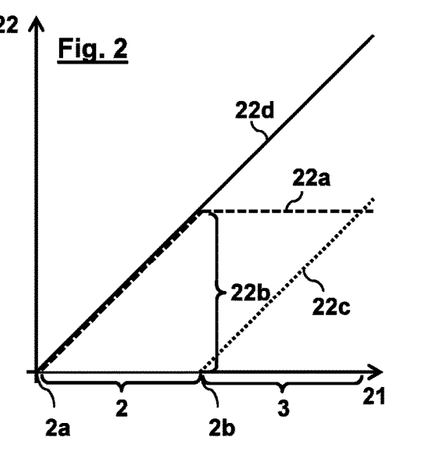
FIG. 2 schematically depicts braking power as a function of pedal displacement for a braking system according to an exemplary embodiment of the invention.

FIG. 2, on the other hand, shows braking power 22 as a function of pedal displacement 21 for a braking system 10 according to an exemplary embodiment of the invention. The pedal displacement 21 may be divided into two ranges, such as a regenerative-braking range 2 of pedal displacement running from an initial position 2a of the brake pedal 1 to a maximal-recuperation position 2b of the brake pedal and a mechanical-braking range 3 of pedal displacement starting from the maximal-recuperation position 2b of the brake pedal 1. Accordingly, a typical braking process includes two stage: a regenerative-braking process as a first stage (e.g., immediately after activating the brake pedal 1) and a subsequent mechanical-braking process as a second stage (e.g., when the brake pedal 1 is moved further than the maximal-recuperation position 2b). The braking system 10, in particular the brake pedal 1, may be configured as one of the exemplary embodiments according to FIGS. 7 to 9, which are described in more detail below. The braking systems 10 may be integrated in an electric vehicle 100 as it is exemplary shown in FIG. 10. The electric vehicle 100 may be, for example, a hybrid vehicle with a combustion engine 24 on the one hand and an electric engine 23 connected to a traction battery 6 on the other.

As shown in FIG. 2, the total braking power 22d is the sum of the regenerative-braking power 22a of the regenerative braking and the mechanical-braking power 22c of the mechanical braking. In contrast to the conventional case of FIG. 1 however, in this exemplary embodiment of the invention, regenerative-braking power 22a contributes exclusively to the total braking power 22d within the regenerative-braking range 2. Mechanical braking is only activated after the pedal displacement 21 reaches the maximal-recuperation position 2b and thus mechanical-braking power 22c only contributes to the total braking power 22d after this point (within the mechanical-braking range 3). This provision ensures that the braking and thus, the energy saving potential of the regenerative braking is fully exploited. Mechanical braking may only be utilized when the maximal regenerative braking power 22b is insufficient to perform the requested braking maneuver, i.e. when the brake pedal 1 is pushed further than the maximal-recuperation position 2b.

Figures 3, 4, 5:
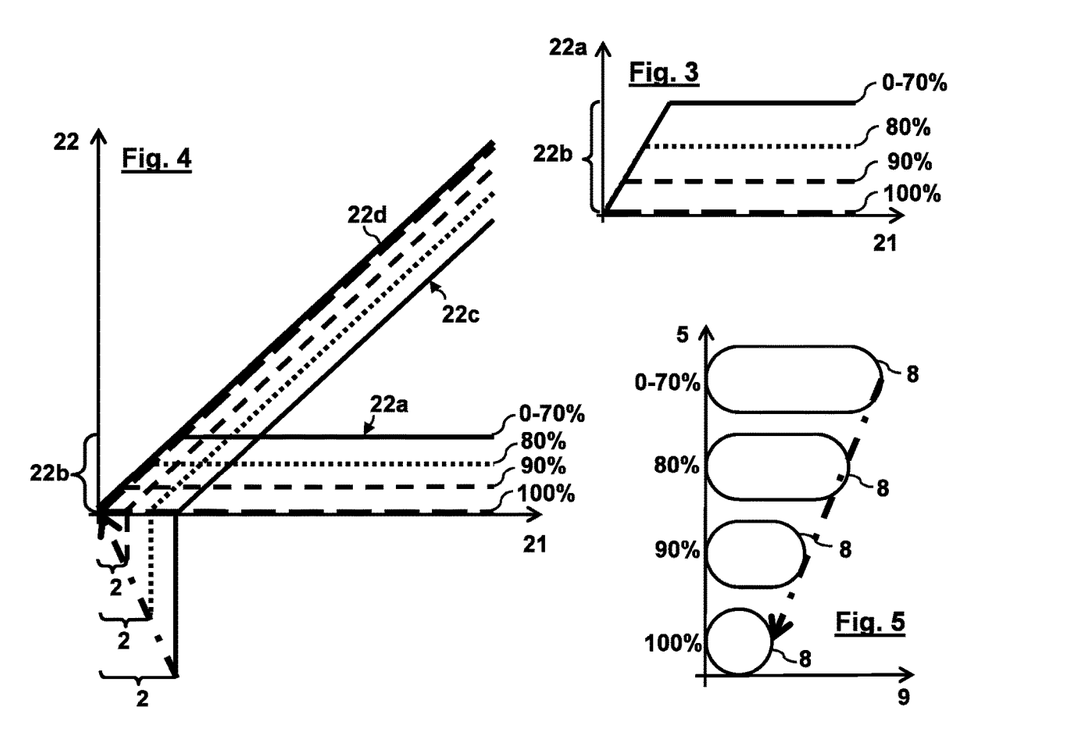
FIG. 3 exemplary depicts regenerative braking power as a function of pedal displacement for different states of charge of a traction battery of the braking system of FIG. 2 according to an exemplary embodiment of the invention.
FIG. 4 schematically depicts braking power as a function of pedal displacement for different states of charge of the traction battery of FIG. 3 according to an exemplary embodiment of the invention.
FIG. 5 depicts an elongated aperture used in the braking system of FIG. 2 for different states of charge of a traction battery according to an exemplary embodiment of the invention.

FIG. 3 exemplary shows the regenerative braking power 22a of the braking system 10 of FIG. 2 as a function of pedal displacement 21 for different states of charge (SOC) 5 of the traction battery 6. In particular, the solid line refers to a state of charge 5 between about 0 and 70%, the dotted line refers to a state of charge 5 of about 80%, the short-dashed line refers to a state of charge 5 of about 90% and the long-dashed line refers to a state of charge 5 of about 100%. As shown in FIG. 3 for this particular example, the maximal regenerative braking power 22b may only be utilized when the state of charge 5 of the traction battery 6 is between 0 and 70%. For greater values of the state of charge 5, only a reduced amount of regenerative braking power 22a is available. In the extreme case of a fully charged traction battery 6, regenerative braking is not possible and thus is unable to contribute regenerative-braking power 22b.

FIG. 4 schematically depicts braking power 22 as a function of pedal displacement 21 for different states of charge 5 of the traction battery 6 of the braking system 10 of FIG. 2. As shown in FIG. 4, the regenerative-braking range 2 decreases as the state of charge 5 of the traction battery 6 passes the 70% threshold and decreases until about zero in case of a fully charged traction battery 6. In that case, only mechanical-braking power 22c contributes to the total braking power 22d. It will be immediately clear to the person of skill that the specific values of battery charges and functional values for the braking power are merely provided as an example and will differ from these particular values in other exemplary embodiments of the invention.

FIG. 5 depicts aperture length 9 of a horizontal, elongated aperture 8 used in the braking system 10 of FIG. 2 for different states of charge 5 of the traction battery 6. As will be explained with reference to FIGS. 7 to 9 in detail, the elongated aperture 8 may be used to define the regenerative-braking range 2. By varying the length of the elongated aperture 8, the length of the regenerative-braking range 2 may be adjusted. The elongated aperture 8 may define a range of "free travel" of the brake pedal 1, in which no mechanical braking occurs and only recuperative braking is used. The arrow in FIG. 5 indicates that the aperture length 9 of the elongated aperture 8 may be continuously reduced from a state of charge 5 between about 0 and 70% to a fully charged traction battery 6 of about 100% (cf. arrow in FIG. 4). In that case, the elongated aperture 8 may reduce to a circular aperture, which does not provide any regenerative-braking range 2, and the braking system 10 may be configured to activate mechanical braking when the brake pedal 1 is operated.

Figure 7:
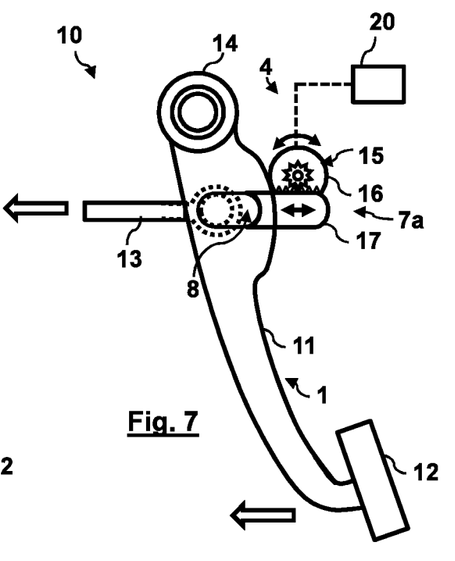
FIG. 7 schematically shows a braking system according to an exemplary embodiment of the invention.

FIG. 7 schematically shows a braking system 10 according to an exemplary embodiment of the invention. As described above, the braking system 10 may include a brake pedal 1 having a regenerative-braking range 2 of pedal displacement from an initial position 2a of the brake pedal 1 to a maximal-recuperation position 2b of the brake pedal 1 and a mechanical-braking range 3 of pedal displacement starting from the maximal-recuperation position 2b of the brake pedal 1. The regenerative-braking range 2 may be defined by an elongated aperture 8 within the brake pedal 1, in which a push rod 13 of the brake pedal 1 is mounted and which is adjustable in length 9 to vary the regenerative-braking range 2 (cf. black arrow on the right hand side of FIG. 7).

The braking system 10 may further include a brake controller 4 configured to activate deceleration of the electric vehicle 100 based on the pedal displacement. Specifically, the brake controller 4 may be configured to activate deceleration of the electric vehicle 100 based on regenerative braking within the regenerative-braking range 2 and based on mechanical braking within the mechanical-braking range 3. The brake controller 4 may be configured to adjust the regenerative-braking range 2 based on the state of charge 5 of the traction battery 6 of the electric vehicle 100. Accordingly, the brake controller 4 may include a control unit 20, in communication with to the traction battery 6 and/or the electric engine 23 and/or other components of the electric vehicle 100 and which may be a processor, a microcontroller or similar. The brake controller may be operated by a vehicle controller. Additionally, the brake controller 4 of this exemplary embodiment may further include a pedal adjuster 7a attached to the brake pedal 1 and configured to adjust the regenerative-braking range 2. The pedal adjuster 7a may be a linear pedal adjuster 7a configured to linearly adjust the regenerative-braking range 2.

Particularly, the linear pedal adjuster 7a may include a toothed wheel 16 driven by an electrical adjustment motor 15 and configured to drive in turn a sliding toothed and/or slotted rack 17, enlarging or decreasing the elongated aperture 8. The adjusted aperture length 9 of the elongated aperture 8 defines at which point the push rod 13 within the elongated aperture 8 is activated by engaging the brake pedal 1 after a defined range of "free travel" through the elongated aperture 9, in which regenerative braking is used.

Accordingly, the linear pedal adjuster 7a may be configured to to continuously reduce and/or enlarge the regenerative-braking range 2. The brake controller 4 may be configured to reduce the regenerative-braking range 2 via the linear pedal adjuster 7a with increasing state of charge 5 of the traction battery 6 when the state of charge 5 of the traction battery 6 exceeds a predefined charge threshold, e.g. about 70% as detailed before. The brake controller 4 along with the linear pedal adjuster 7a and the elongated aperture 8 may be further configured to adjust the regenerative-braking range 2 to reach a maximal available recuperation of about 100% of the electric vehicle 100 after a pedal displacement is equal to the regenerative-braking range 2.

The brake controller 4 may be further configured to reduce the regenerative-braking range 2 to about zero when the traction battery 6 is in an error state and/or the traction battery 6 is fully charged. An error state of the traction battery 6 may be, for example, any case of system failure of the traction battery 6, in which the battery 6 is not fully operational or, more generally, any case of system failure, in which the electric components of the power train of the electric vehicle 100 are not fully operational.

Further, the brake controller 4 may be configured to first check if the traction battery 6 is functional. In response to detecting an error, the regenerative-braking range 2 may be set to zero. Otherwise the brake controller 4 may be configured to detect the state of charge 5 of the traction battery 6. When the state of charge 5 is between, for example, about 0% and 70%, the regenerative-braking range 2 may be set to a maximum (MAX). When the state of charge 5 surpasses a charge threshold y, in this example y=70%, the brake controller 4 may be configured to adjust the regenerative-braking range 2 continuously according to the following formula:

$$rbr = MAX - (MAX/100 - y) * (SOC - y),$$

wherein rbr is the regenerative-braking range 2 and SOC is the state of charge 5. The regenerative-braking range 2 may be varied between a maximum (for y from 0% to 70%) and zero (for y=100%).

Figure 8:
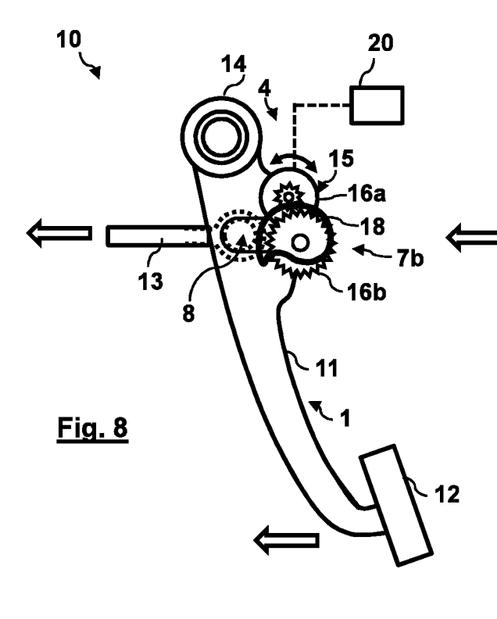
FIG. 8 schematically shows a braking system according to another exemplary embodiment of the invention.
Figure 9:
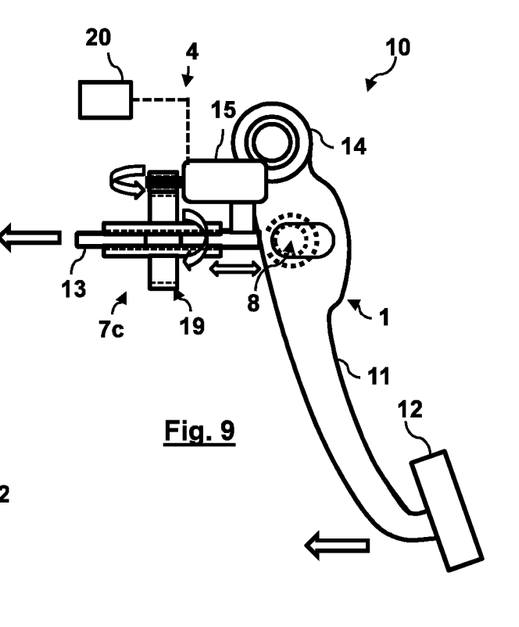
FIG. 9 schematically shows a braking system according to yet another exemplary embodiment of the invention.
Figure 10:
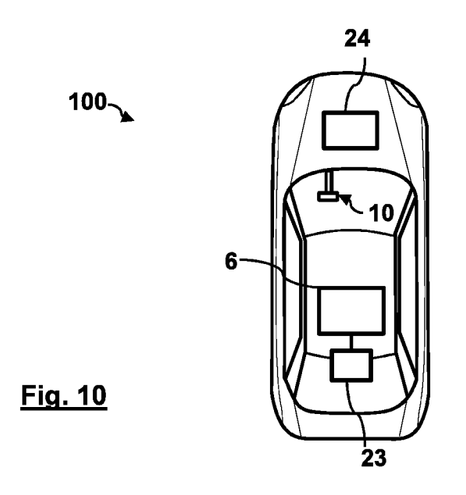
FIG. 10 schematically shows an electric vehicle comprising one of the braking systems of FIGS. 7 to 9 according to an exemplary embodiment of the invention.

Moreover, FIGS. 8 and 9 depict similar exemplary embodiments of a braking system 10, in which different pedal adjuster 7b, 7c configurations are provided. FIG. 8 features an eccentric pedal adjuster 7b configured to adjust the regenerative-braking range 2 with an eccentric element 11 operated by a toothed wheel 16b, which in turn may be operated by another toothed wheel 16a connected to an electric adjustment motor 15. Due to the eccentricity of the eccentric element 11 non-linear adjustments and/or variations of the regenerative-braking range 2 are possible. The exemplary embodiment of FIG. 9 may include a rotating pedal adjuster 7c configured as a spindle drive with electric adjustment motor 15 and threaded spindle 19 to rotatably adjust the regenerative-braking range 2. For example, a clockwise rotation may enlarge the elongated aperture 8, while a counterclockwise rotation may decrease the elongated aperture 8.

In conclusion, the regenerative-braking range 2 may be adjusted based on the state of charge 5 of the traction battery 6 and thus, the brake pedal 1 movement compensates for charge fluctuations and thus provides a constant brake feel for the driver. The regenerative braking potential may be fully exploited as mechanical braking is only activated after the maximal regenerative braking power 22*b* is provided by the regenerative braking. This leads to higher CO2 reduction and/or extension of driving range as well as reduced wear of the mechanical brakes, e.g. vacuum boosted friction brakes. Finally, costs may also be reduced. In principle, the exemplary embodiments of FIGS. 7 to 9 may replace conventional systems as the one in FIG. 6. Accordingly, it may be sufficient to merely replace the brake pedal 1 with the brake pedals 1 of FIGS. 7 to 9 as the brake adjusters 4 are integrated in the brake pedals 1.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The exemplary embodiments were chosen and described to best explain the principles of the invention and its practical applications, to thereby enable others skilled in the art to best utilize the invention and various exemplary embodiments with various modifications as are suited to the particular use contemplated. Many other examples will be apparent to one skilled in the art upon reviewing the above specification.

REFERENCE LIST

1 brake pedal
2 regenerative-braking range
2*a* initial position
2*b* maximal-recuperation position
3 mechanical-braking range
4 brake controller
5 state of charge
6 traction battery
7*a* linear pedal adjuster
7*b* eccentric pedal adjuster
7*c* rotating pedal adjuster
8 elongated aperture
9 aperture length
10, 10' braking system
11 brake lever
12 foot pad
13 push rod
14 fulcrum
15 electric adjustment motor
16, 16*a*, 16*b* toothed wheel
17 sliding toothed/slotted rack
18 eccentric element
19 threaded spindle
20 control unit
21 pedal displacement
22 braking power
22*a* regenerative-braking power
22*b* maximal regenerative-braking power
22*c* mechanical-braking power
22*d* total braking power
23 electric engine
24 combustion engine
100 electric vehicle

What is claimed is:

1. A braking system for braking an electric vehicle, comprising:
a brake pedal including:
a regenerative-braking range of pedal displacement from an initial position of the brake pedal to a maximal-recuperation position of the brake pedal, and
a mechanical-braking range of pedal displacement starting from the maximal-recuperation position of the brake pedal; and
a brake controller configured to:
activate deceleration of the electric vehicle based on the pedal displacement
and regenerative braking within the regenerative-braking range and based on mechanical braking within the mechanical-braking range; and
adjust the regenerative-braking range based on a state of charge of a traction battery of the electric vehicle,
wherein the braking controller includes a pedal adjuster configured to adjust the regenerative-braking range,
wherein the pedal adjuster is attached on the brake pedal, and
wherein the pedal adjuster includes least one selected from the group consisting of: an eccentric pedal adjuster configured to adjust the regenerative-braking range with an eccentric element operated by a toothed wheel, which in turn is operated by another toothed wheel connected to an electric adjustment motor, and a rotating pedal adjuster configured as a spindle drive with an electric adjustment motor and a threaded spindle to rotatably adjust the regenerative-braking range.

2. The braking system according to claim 1, wherein the brake controller is configured to continuously reduce the regenerative-braking range with increasing state of charge of the traction battery.

3. The braking system according to claim 2, wherein the brake controller is configured to start reducing the regenerative-braking range when the state of charge of the traction battery exceeds a predefined charge threshold.

4. The braking system according to claim 3, wherein the brake controller is configured to adjust the regenerative-braking range to reach a maximal available recuperation of the electric vehicle after a pedal displacement equal to the regenerative-braking range.

5. The braking system according to claim 4, wherein the brake controller configured to reduce the regenerative-braking range to about zero when the traction battery is in an error state and/or the traction battery is fully charged.

6. The braking system according to claim 1, wherein the regenerative-braking range is defined by an elongated aperture within the brake pedal, the elongated aperture being adjustable in length to adjust the regenerative-braking range.

7. An electric vehicle comprising:
an electric engine;
a traction battery; and
a braking system including:
a brake pedal having:
a regenerative-braking range of pedal displacement from an initial position of the brake pedal to a maximal-recuperation position of the brake pedal, and a mechanical-braking range of pedal displacement starting from the maximal-recuperation position of the brake pedal; and a brake controller configured to:

activate deceleration of the electric vehicle based on the pedal displacement and regenerative braking within the regenerative-braking range and based on mechanical braking within the mechanical-braking range; and adjust the regenerative-braking range based on a state of charge of a traction battery of the electric vehicle, wherein the braking controller includes a pedal adjuster configured to adjust the regenerative-braking range, wherein the pedal adjuster is attached on the brake pedal, wherein the pedal adjuster includes least one selected from the group consisting of: an eccentric pedal adjuster configured to adjust the regenerative-braking range with an eccentric element operated by a toothed wheel, which in turn is operated by another toothed wheel connected to an electric adjustment motor, and a rotating pedal adjuster configured as a spindle drive with an electric adjustment motor and a threaded spindle to rotatably adjust the regenerative-braking range.

8. The electric vehicle of claim 7, wherein the brake controller is configured to continuously reduce the regenerative-braking range with increasing state of charge of the traction battery.

9. The electric vehicle of claim 8, wherein the brake controller is configured to start reducing the regenerative-braking range when the state of charge of the traction battery exceeds a predefined charge threshold.

10. The electric vehicle of claim 9, wherein the brake controller is configured to adjust the regenerative-braking range to reach a maximal available recuperation of the electric vehicle after a pedal displacement equal to the regenerative-braking range.

11. The electric vehicle of claim 10, wherein the brake controller configured to reduce the regenerative-braking range to about zero when the traction battery is in an error state and/or the traction battery is fully charged.

12. The electric vehicle of claim 7, wherein the regenerative-braking range is defined by an elongated aperture within the brake pedal, the elongated aperture being adjustable in length to adjust the regenerative-braking range.

* * * * *